United States Patent
Alatorre et al.

(10) Patent No.: US 10,445,253 B2
(45) Date of Patent: Oct. 15, 2019

(54) COST EFFECTIVE SERVICE LEVEL AGREEMENT DATA MANAGEMENT

(71) Applicant: International Business Machines Corporation, Armonk, NY (US)

(72) Inventors: Gabriel Alatorre, Long Beach, CA (US); Heiko Ludwig, San Francisco, CA (US); Nagapramod S. Mandagere, San Jose, CA (US); Mohamed Mohamed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/133,734

(22) Filed: Apr. 20, 2016

(65) Prior Publication Data

US 2017/0308482 A1    Oct. 26, 2017

(51) Int. Cl.
*G06F 12/12*       (2016.01)
*G06F 12/126*     (2016.01)

(52) U.S. Cl.
CPC .... *G06F 12/126* (2013.01); *G06F 2212/1021* (2013.01); *G06F 2212/281* (2013.01)

(58) Field of Classification Search
CPC ......... G06F 2212/1021; G06F 2212/69; G06F 17/30085; G06F 12/126
See application file for complete search history.

(56) References Cited

U.S. PATENT DOCUMENTS 8,700,806 B1   4/2014  Slik
9,021,204 B1   4/2015  Awasthi et al.
2005/0086646 A1*  4/2005  Zahavi ............... G06F 11/3476 717/131
2010/0274827 A1* 10/2010  Hix .................... G06F 17/30085 707/813
2011/0296019 A1* 12/2011  Ferris ................. G06F 9/45533 709/226
2012/0284389 A1* 11/2012  Azagury ............... G06F 21/604 709/223

(Continued)

OTHER PUBLICATIONS

IEEE Xplore proceedings 2003 International Conference on Image Processing (Cat. No. 03CH37429): Performance evaluation of Euclidean/correlation-based relevance feedback algorithms in content-based image retrieval systems (Year: 2003).*

*Primary Examiner* — Masud K Khan
(74) *Attorney, Agent, or Firm* — Lieberman & Brandsdorfer, LLC

(57) ABSTRACT

The embodiments described herein relate to dynamically managing metric data of a network environment with respect to a data storage system. A data retention policy is analyzed, which includes extracting one or more metric definitions from the retention policy. A relevance of a set of metric data is identified based on the analysis. The set of metric data includes an aggregation of one or more metric observations. A storage location in a data storage system for the set of metric values is selected based on the identified relevance. The data storage system includes a cache storage location and a persistent storage location. The set of metric data is retained in the selected storage location. As the retention policy is modified, select data may be re-classified and moved within the storage system based on the re-classification.

20 Claims, 9 Drawing Sheets

(56) References Cited

U.S. PATENT DOCUMENTS

| | | | | |
|---|---|---|---|---|
| 2014/0208018 A1* | 7/2014 | Benhase | ............. | G06F 12/0866 |
| | | | | 711/113 |
| 2015/0363250 A1* | 12/2015 | Yabuki | ................ | G06F 11/0721 |
| | | | | 714/37 |
| 2016/0036665 A1* | 2/2016 | Borah | ................... | H04L 43/065 |
| | | | | 709/221 |
| 2018/0143982 A1* | 5/2018 | Kraus | ............... | G06F 17/30867 |

* cited by examiner

COST EFFECTIVE SERVICE LEVEL AGREEMENT DATA MANAGEMENT

BACKGROUND

The present embodiments relate to data management. More specifically, the embodiments relate to management of metric data within a storage system.

Economies of scale, agility, availability, and on-demand pricing models have enabled a variety of application deployment models, suiting different needs of different organizations. Applications commonly span across on-premises, public cloud, and private cloud, either directly or indirectly through platforms they operate on or services they consume. Shared services and infrastructures that back applications are commonly managed by multiple Infrastructure as a Service (IaaS) providers and/or Platform as a Service (PaaS) providers, depending on the type of deployment. From the perspective of the application, this distributed and shared resource model necessitates monitoring of application resource usage to ensure proper support and performance tuning of the application(s). Several solutions exist to support the resource model monitoring. One such solution includes a system that polls the status of a monitored target. Another solution employs data collectors and maintains or manually re-configures application resource assignment. However, these solutions do not account for recycling monitoring tools and facilities that have already been deployed by associating the deployed tools for new applications. More specifically, the solutions that are known and employed are static and are not designed to dynamically accommodate expansion of one or more deployed applications, including scalability with respect to a new application.

Service level agreements (SLAs) are typically composed of multiple metrics combined together based on client specific definitions. SLAs monitor or visualize a specific aspect of business value. Based on client needs, different temporal dimensions can be specified (e.g., availability over last 30 days (moving average), over the past year, etc.). Monitoring SLAs for environments entails collecting vast amounts of metric data streams for aggregation and evaluation against service level objectives (SLOs). In one embodiment, the SLO is a key element of a SLA between a service provider and a customer. SLOs measure the performance of the service provider, and in one embodiment, function as a tool to avoid disputes between the provider and the customer. For computational purposes, it is beneficial for the metric data to accessible in a "fast" storage medium (e.g. flash storage), which may be financially expensive. After aging and no longer having immediate need, the metric data can be moved to less expensive storage, such as disk-based object storage. If data becomes relevant again, it must be moved from the persistent storage back to the fast storage medium. Cost pressures while designing monitoring/management solutions are typically much higher than other services as these costs cannot be transitioned to customers and are typically the responsibility of service providers. Accordingly, tiered storage techniques, which are techniques for assigning different categories of data to different storage media, have become even more crucial for such solutions.

SUMMARY

The aspects described herein include a system, computer program product, and method for dynamically managing metric data within a storage system.

According to one aspect, a system is provided to manage metric data within a storage system. The system includes a processor in communication with memory. The system further includes a tool in communication with the processor. The tool includes one or more modules to analyze a data retention policy and program code to extract one or more metric definitions from the retention policy. A relevance of a set of metric data is identified based on the analysis. The set of metric data includes an aggregation of one or more metric observations. A storage location in a data storage system for the set of metric data is selected based on identified relevance. The data storage system includes a cache storage location and a persistent storage location. The set of metric data is retained in the selected storage location.

According to another aspect, a computer program product is provided to manage metric data within a tiered storage system. The computer program product includes a computer readable storage device having computer readable program code embodied therewith. The program code is executable by a process to analyze a data retention policy, which includes the program code to extract one or more metric definitions from the retention policy. Relevance of a set of metric data is identified based on the analysis. The set of metric data includes an aggregation of one or more metric observations. A storage location in a data storage system for the set of metric values is selected based on the identified relevance. The data storage is organized with at least two tiers in the hierarchy, including a tier for cache and a tier for persistent storage. Data assessed as relevant is stored in the cache and data assessed as irrelevant is stored in persistent storage.

According to yet another aspect, a method is provided for managing metric data within a hierarchically defined storage system. A data retention policy is analyzed, which includes extracting one or more metric definitions from the retention policy. A relevance of a set of metric data is identified based on the analysis. The set of metric data includes an aggregation of one or more metric observations. A storage location in a data storage system for the set of metric values is selected based on the identified relevance. The data storage system includes at least two storage locations, including cache and persistent storage. Metric data determined to be relevant is retained in the cache and data determined to be irrelevant is stored in persistent storage.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
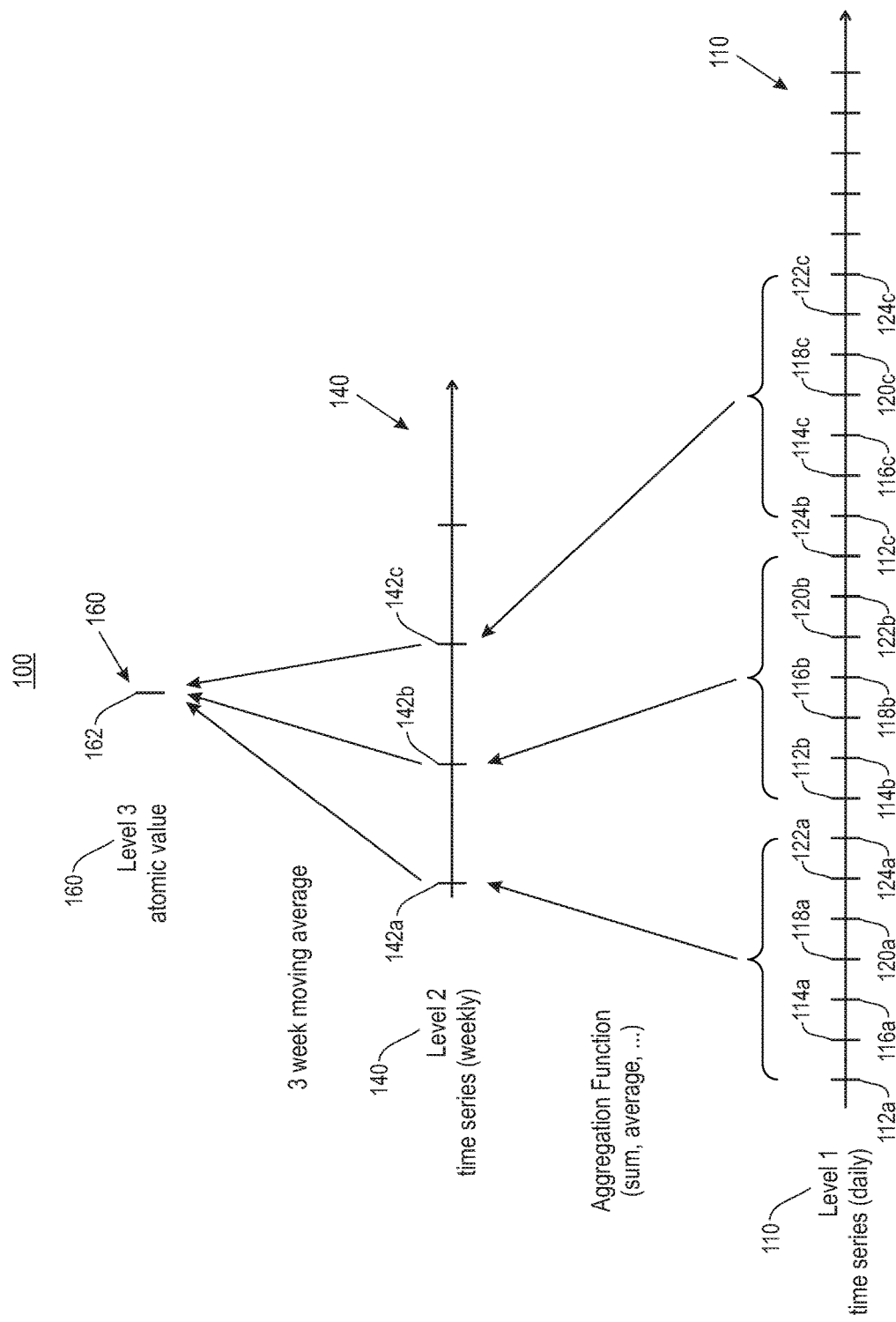
FIG. 1 depicts a block diagram illustrating a metric graph structure for time series management of data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Storage systems are generally organized with different forms of data storage, with each category of storage having an associated cost. This organization is known as a hierarchical storage system, and management of data within the storage system is referred to herein as hierarchical storage management. Storage of data in the storage system includes selected data assignment within the storage hierarchy. In one embodiment, data may be assigned to a category, and based on the category assigned to a storage device within a selected tier of the hierarchy. In one embodiment, the categories may be based on security requirements, performance requirements, frequency of use, availability requirements, etc.

Individual storage devices in the hierarchy are assigned to a specific tier in the storage hierarchy. Data is either assigned to a specific storage device or a select tier. In one embodiment, the assignment may be automated, with the autonomy extending to promoting and demoting data across tiers of storage media. Accordingly, within the storage system data is subject to movement via the automated tiering process.

The value of data is affected by the passage of time. Like people, data is subject to aging. Current data, e.g. data that has not been subject to aging, may have a higher intrinsic value than older data. In one embodiment, current data may be considered to have a greater relevance than older data, which may be considered less relevant, and in one embodiment, less relevant data is categorized as less likely to be used in comparison to data that is current. Time to live (TTL) is a mechanism used to limit the lifespan of data. The TTL may be implemented as a counter or timestamp embedded in or otherwise attached to its respective data. When the TTL has been reach, the data will be removed or demoted within the storage hierarchy.

A time series is a sequence of numerical data points in successive order, usually occurring in uniform intervals. More specifically, a time series is a sequence of values collected at regular intervals over a period of time. With reference to FIG. 1, a block diagram (100) is provided illustrating a metric graph structure for time series management of data. In the example represented the graphical representation organizes the data at three separately defined intervals. However, the intervals provided herein are merely an example, and as such should not be considered limiting. Each defined interval is represented as a level in a hierarchy, including a first level (110), a second level (140), and a third level (160). The first level (110) pertains to a first time series metric of the associated data as defined by a first time interval, the second level (140) pertains to a second time series metric of data as defined by a second time interval and that employs the data from the first level (110), and the third level (160) pertains to a third time series metric of data as defined by a third time interval and that employs data from the second level (140), and inherently employs data from the first level (110). Accordingly, the represented levels are related by their representation of the underlying data.

The data represented in the first level (110) is subject to a first function, such as, but not limited to, an aggregation. Examples of aggregation functions include, but are not limited to sum, average, etc. In one embodiment, the first level represents processed raw data associated with the granularity representative of the level. For example, the first level (110) includes data associated with a processed daily set of values. In one embodiment, the data may represent response time latency, service up time, customer satisfaction, etc. Similarly, in one embodiment, the data may represent different criteria. As shown herein, the first level (110) has a plurality of daily data entry representations (112a)-(124a), (112b)-(124b), (112c)-(124c), etc. Each individual entry represents data tracked for a separate 24 hr period. Accordingly, regardless of the category of the criteria, the each entry in the first level (110) is representative of a time series value tracked and/or managed on a daily basis.

Data in the second level (140) is represented as an aggregation of a select range of data from the first level (110). In the example shown herein, each entry in the second level (140) represents an aggregation on a weekly basis, e.g. an aggregation of seven consecutive entries from the first level (110). Entry (142a) represents a weekly numerical value based on a compilation or aggregation of values from the days represented at (112a)-(122a). Similarly, entry (142b) represents a weekly numerical value based on a compilation or aggregation of values from the days represented at (112b)-(122b), and entry (142c), represents a weekly numerical value based on a compilation or aggregation of values from the days represented at (112c)-(122c). Thus, each entry in the second level (140) represents separate weekly time series data. Accordingly, each entry (142a)-(142c) in the second level (140) is representative of a time series value that is based upon a plurality of entries in the first level (110).

Similarly, the entry (162) in the third level (160) represents an aggregation of a plurality of entries from the second level (140). In the example shown herein, the third level represents a three week moving average, and based on this representation, the third level is a compilation or aggregation of three consecutive entries from the second level (140), shown herein to include (142a), (142b), and (142c).

The hierarchy show in FIG. 1 is shown with three levels, although in one embodiment, the hierarchy may be expanded to include additional levels, or reduced to show a more limited quantity of levels. As shown herein, the third level (160) includes an atomic value (162), as opposed to the time series values included in the first and second levels (110) and (140). The atomic value (162) is shown to have a basis of three time series values (142a)-(142c) from the second level (140). In one embodiment, the atomic value (162) represents a three week moving average. Accordingly, the hierarchy shown herein as an example of time series data, and representation of daily values into weekly value, with representation of a weekly moving average in the form of an atomic value.

The data representation shown in FIG. 1 is maintained in data storage. In one embodiment, the value of the data may decrease as a function of time. For example, since the atomic value (162) is configured, in one embodiment, to represent a three week moving average, the value of the data may decrease after three weeks. In one embodiment, the time series data may be based on different parameters and associated time intervals, with an associated decay factor of the data defined by the time interval parameters. Accordingly, the three week moving average shown herein is an example and should not be considered limiting.

Figure 2:
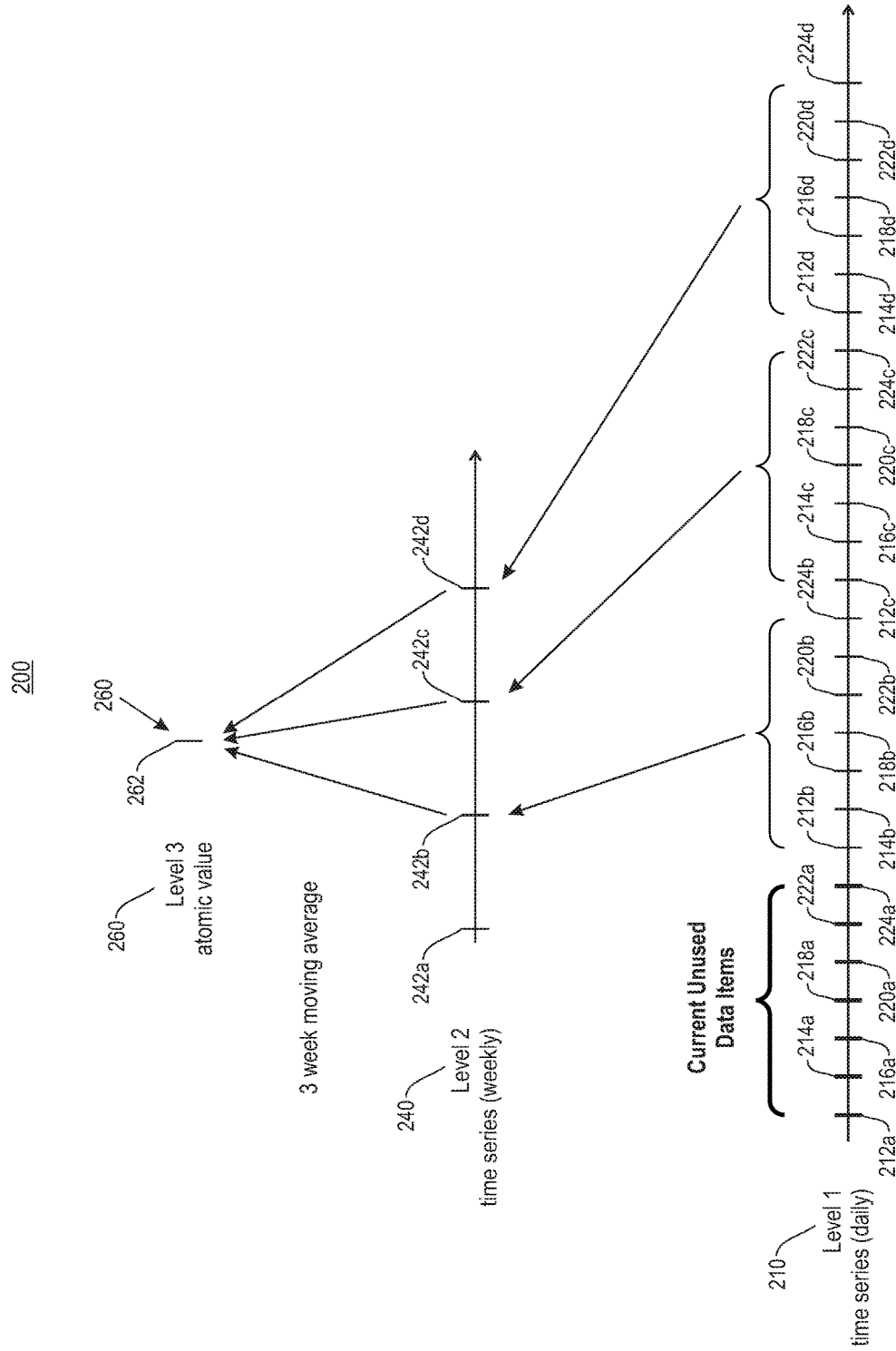
FIG. 2 depicts a block diagram illustrating a metric graph structure for movement of time series data.

Based on the time intervals shown and described in FIG. 1, after a week has passed, the three week moving average changes since the basis for the data changes. Referring to FIG. 2, a block diagram (100) is provided illustrating a metric graph structure showing movement of time series data. Similar to the diagram shown in FIG. 1, the data is represented in a hierarchy having three levels (210), (240), and (260). In this example, seven days have passed in comparison to the metric graph shown in FIG. 1. The first level (210), shows daily values over a four week period, with the first week represented at (212a)-(224a), the second week at (212b)-(224b), the third week at (212c)-(224c), and the fourth week at (212d)-(224d). Similarly, the second level (240) is shown to have three active time series values (242b), (242c), and (242d), and one inactive time series value (242a). The third level (260) is shown with a single atomic value (262) with a basis of three time series values (242b)-(242d) from the second tier (240). In the example shown herein, the atomic value (262) represents a three week moving average with a basis of the three weeks being different than the basis shown in FIG. 1.

The active data shown in the hierarchy of FIG. 2 is related to time series data across a three week period of time that partially overlaps with the three week period represented in FIG. 1. Data prior to the active three week period is represented as inactive data in the first level as (212a)-(222a) and in the second level (240) as (242a). Inactive data, also shown herein as data that is not a component of the atomic value, can be moved to a different storage area or device i.e., a different tier. In one embodiment, data storage is configured with at least two different categories of storage devices organized as a hierarchy of storage devices, including at least one storage device that functions as cache and another device that functions as persistent data. With respect to the data storage configuration, inactive time series data may be stored on persistent storage that is relatively less expensive than cache. In one embodiment, active data is stored on cache and at such time as the data classification changes, the data may be moved from the cache to a data storage device that is relatively less expensive, such as remote persistent storage. At the same time, data that is defined or employed as active time series data may be stored in the data storage tier defined as cache. In one embodiment, data in the first level (210) that is actively employed in the second and third levels (240) and (260), respectively, is defined as active metric data. Only active metric data needs to remain in an area of data storage defined as cache. Non-active metric data may be moved from the cache to the persistent storage. Accordingly, the organization and movement of data within the data storage area works in conjunction with the definition and categorization of the time series data.

Figure 3:
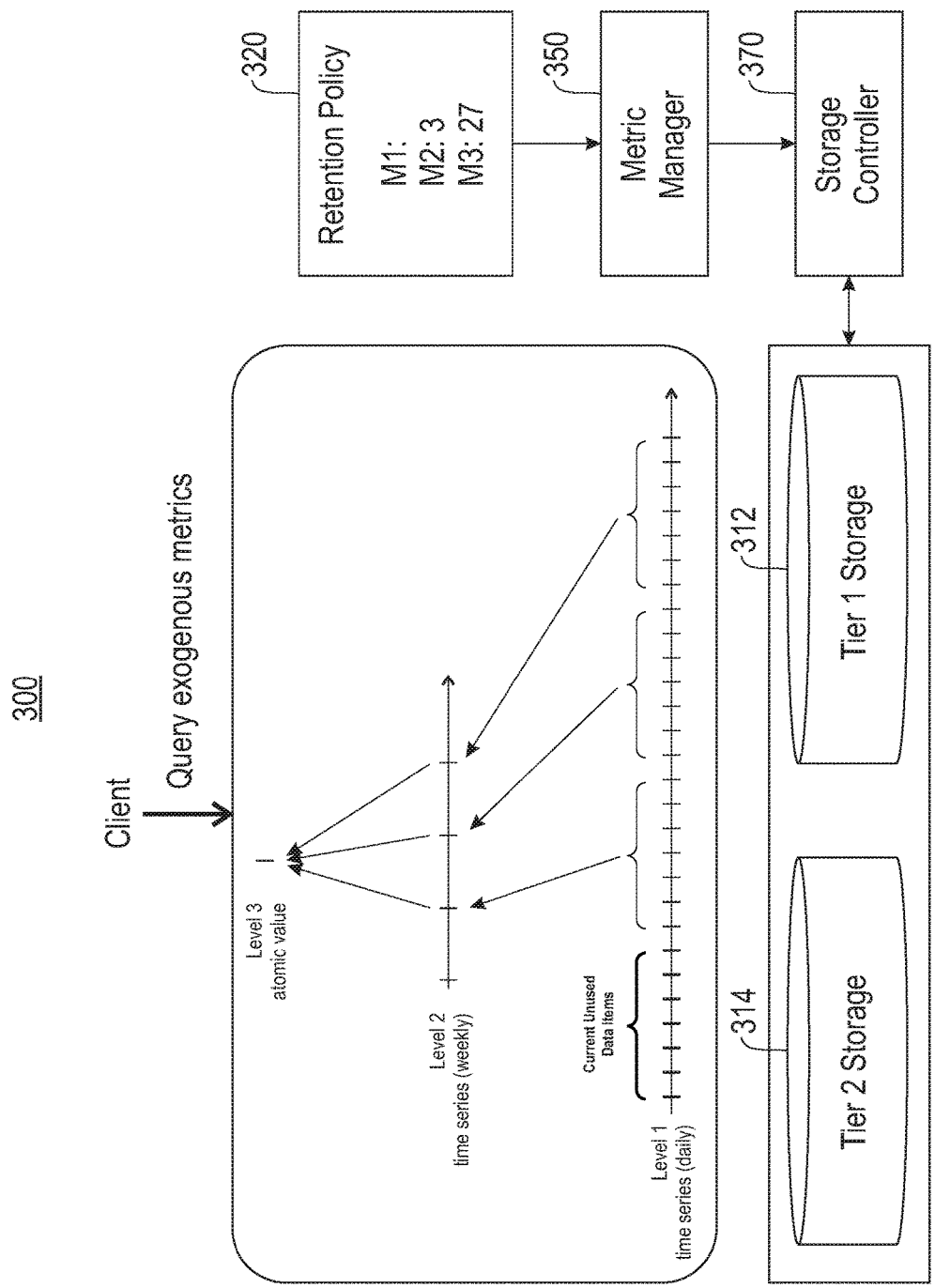
FIG. 3 depicts a block diagram illustrating a system employing the time series data of FIGS. 1 and 2.

A challenge in the management of time series data is data retention. Referring to FIG. 3, a block diagram (300) is provided illustrating a system employing the time series data shown and described in FIGS. 1 and 2. As shown herein, data storage (310) is provided in communication with a defined data retention policy (320). In one embodiment, the data storage (310) is organized as a tiered storage system. The data storage (310) is shown hierarchically organized with at least two tiers of storage in the hierarchy. More specifically, the first data storage tier (312) is shown represented as cache based storage and the second data storage tier (314) is shown represented herein as persistent storage. For example, in one embodiment, the first tier (312) may be in the form of a solid state drive (SSD), which is an all-electronic storage device that is an alternative to a conventional persistent storage device, such as a magnetic storage device. The SSD is generally faster for data access because there is no read or write head to move, such as that present in a magnetic storage device. In one embodiment, the SSD is more expensive in comparison to magnetic storage, and as such, it is desirable to move data within the storage hierarchy so that active data is present in the SSD and inactive data is stored in the magnetic data storage. In this example, only two data tiers (312) and (314) are shown herein in the data storage (310), although this quantity should not be considered limiting. In one embodiment, the data storage hierarchy may be expanded to include additional tiers of data storage. Accordingly, the data storage (310) is organized with at least two tiers of storage devices and functions in conjunction with the data retention policy for efficient and effective management of time series data.

As shown, a data retention policy (320) is provided in relation to the data storage (310). The retention policy is directed to the time series data represented in the data hierarchy shown in FIGS. 1 and 2. In one embodiment, the retention policy is limited to the time series data. A metric manager (350) is provided to interface with the retention policy (320) and data storage (310). More specifically, the metric manager (350) interprets computation of the defined metric based on the retention policy. A storage controller (370) is provided in communication with the data storage (310); the storage controller (370) interfaces with the metric manager (350). The storage controller (370) functions to manage movement of data within the storage hierarchy based on the defined retention policy and the active time series data. Accordingly, time series data is hierarchically organized and moved between the data storage devices based on the retention policy and the data storage hierarchy.

The retention policy may be static, or in one embodiment, may be dynamically modified. Modification of the retention policy includes expansion or contraction of the time period. In either scenario, data in the data storage may be subject to movement within the storage tiers. For example, an expansion of the time period, such as from a three week moving average to a four week moving average, would require identification and movement of data within the data storage (310) from the second tier (314) to the first tier (312).

Conversely, a contraction of the time period, such as from a four week moving average to a three week moving average, would require identification and movement of data within the data storage (310) from the first tier (312) to the second tier (314). Movement of data with respect to changes in the retention policy requires communication between the metric manager (350) and the storage controller (370), with the storage controller (370) having knowledge of which data storage device in the hierarchy holds the relevant data and the ability to identify and communicate with each of the storage devices. The functionality of the manager (350) and controller (370) and the inter-communication provides knowledge of data location and data requirements based on the defined and/or modified retention policy. In one embodiment, the functionality of the manager and controller mitigates and/or eliminates a miss associated with data that may be the subject of the modified retention policy.

Figure 4:
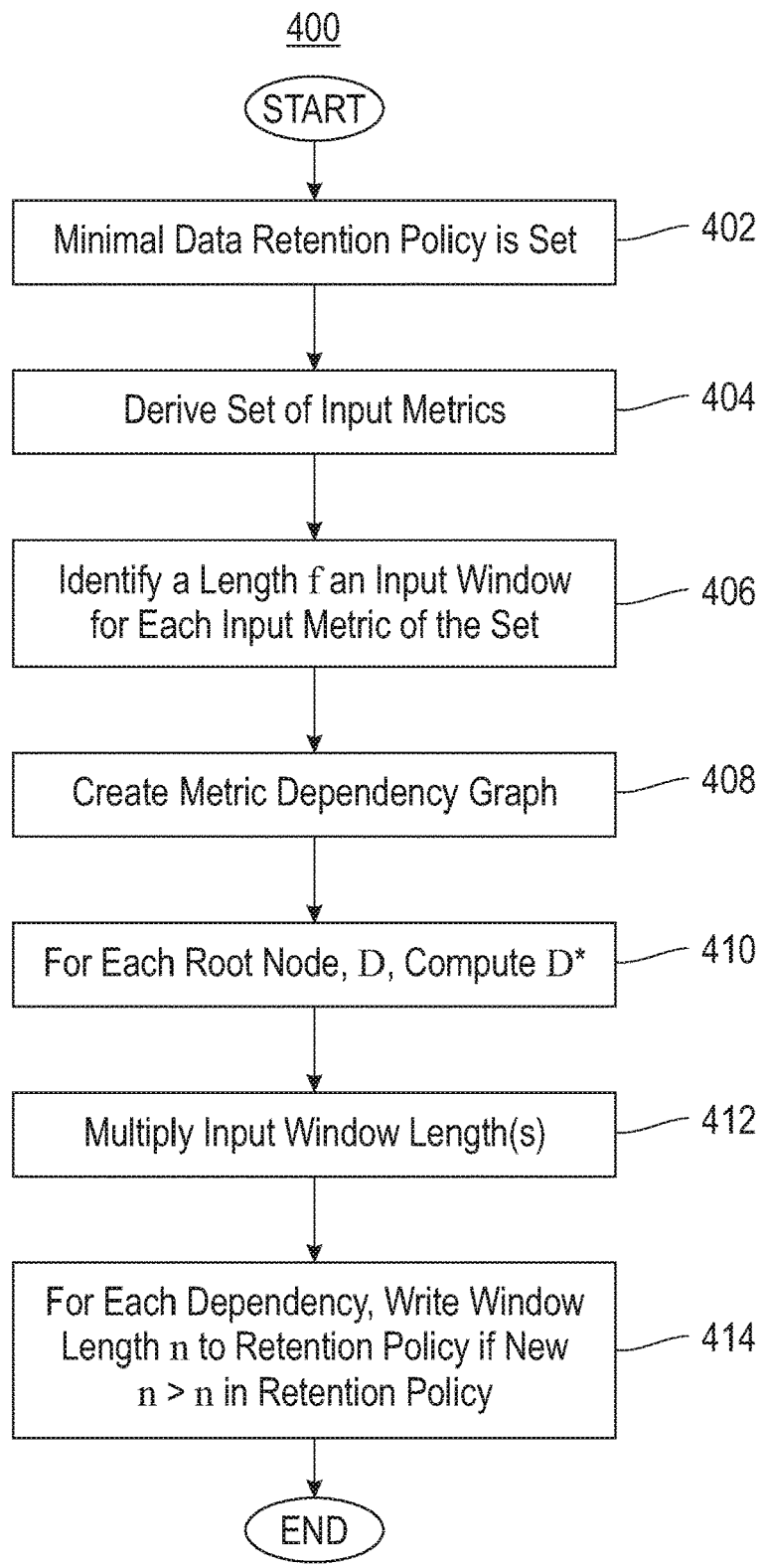
FIG. 4 depicts a flow chart illustrating a process for automating data storage management.

Referring to FIG. 4, a flow chart (400) is provided illustrating a process for automating data storage management with respect data retention policy management. A minimal data retention policy is set (402). In one embodiment, the data retention policy is set at step (402) independently. In another embodiment, the minimal data retention policy is derived from a set of metric definitions. The set of metric definitions may be obtained from one or more service level agreements (SLAs). The implementation described herein refers to the data retention policy as collective of rules or to each individual rule, which entails a data retention policy for each metric. In one embodiment, the relevance of data is linked to the policies, and the relevance of each metric observation is then determined to the proximity of the observation to an associated range of the retention policy.

The minimum retention policy may be autonomously monitored to respond to a retention policy change, such an addition of a new metric, or a removal of an existing metric. Specifically, for each metric definition, a set of input metrics is derived by analyzing a metric expression (404). A length of an input window is identified for each input metric of the set (406). In one embodiment, the length of the input window is zero for non-time series data, and infinite for an unknown length. A metric dependency graph is created based on the input metric set and identified input window lengths (408). In one embodiment, the dependency graph has at least one root node, D and metric dependencies m, where D={(m1, m2, n), ...} where m1 depends on m2, and n is the associated input window length. For each root node, D, in the dependency graph, D+ is computed (410) and the input window lengths n are multiplied (412). In the embodiment described herein, D+ is the transitive closure of relationship D, also referred to herein as the dependency relationship. For example, if D={(a,b), (b,c)}, D+ is {(a,b), (b,c), (a,c)}, and if a depends on b and b depends on c, the set of all direct and indirect dependencies also includes (a,c). For each dependency, m, the window length n is written to the retention policy if the value of the new n exceeds the value of n in the retention policy (414). The process shown herein is repeated each time a new metric is added to the retention policy, or an existing metric is removed from the retention policy. In other words, the modification of the retention policy is reflected into an associated retention policy table where it is invoked into the time series management shown and described in FIGS. 1-3.

As shown in FIGS. 1-4, time series metric data is obtained by aggregating data pursuant to an associated policy. In one embodiment, the policy is related to one or more service level agreements (SLAs), which is a contract between a service provider and an end user that defines the level of service expected from the service provider. It is understood that the terms of the SLA may not always be met. For example, in one embodiment, the service provider may experience an error which would cause the service to be unavailable to the client. The time series management shown and described herein may be employed to track one or more characteristics of the SLA, such as the amount of time a service associated with an SLA is not available to the client.

Figure 5:
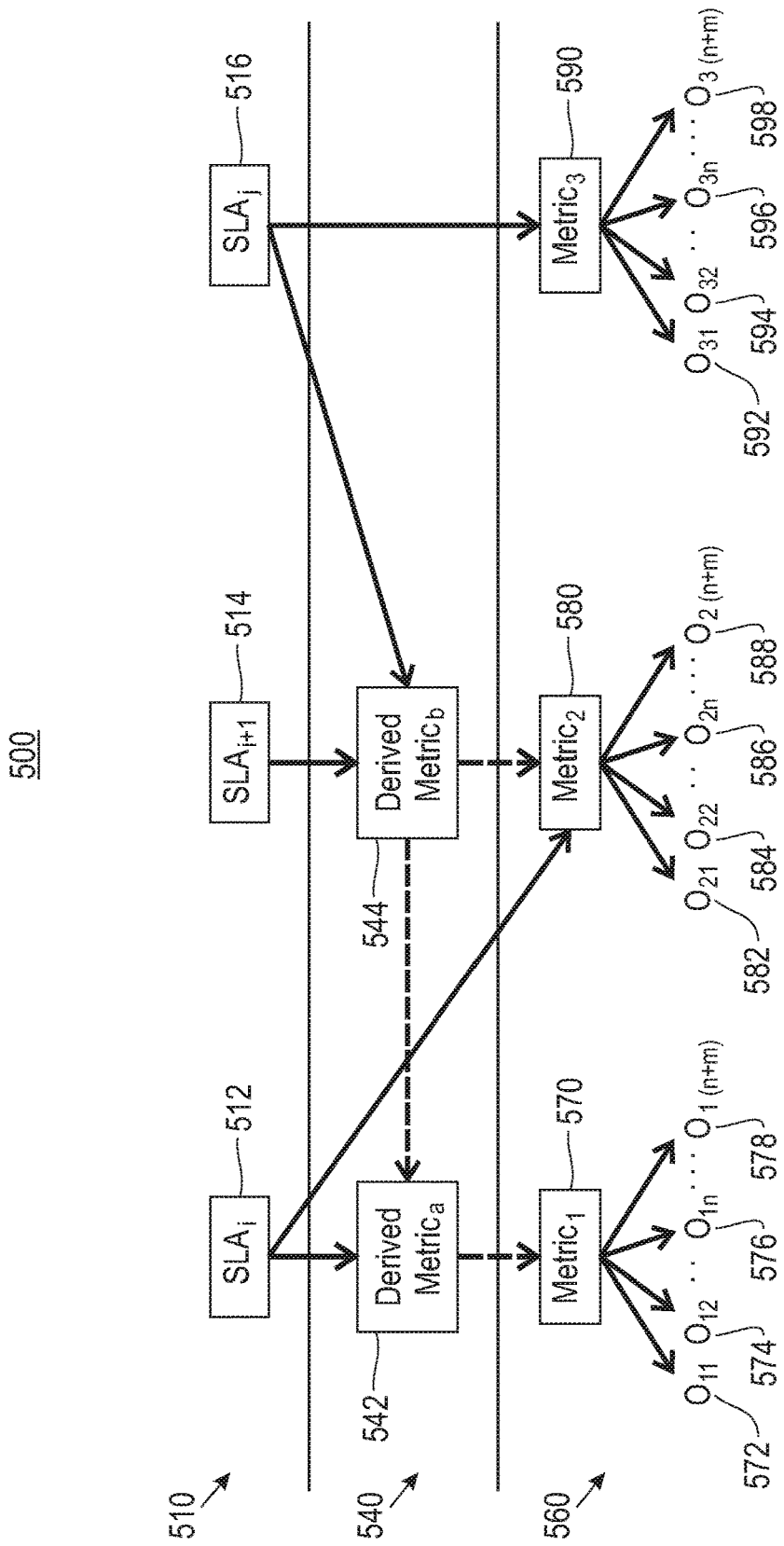
FIG. 5 depicts a dependency graph illustrating a relationship of service level agreements to metric observations.

The representations shown and FIGS. 1 and 2 may be employed to track time series data for a single SLA or a single parameter within a single SLA. In one embodiment, an entity may be supported by multiple SLAs. Each SLA may have separate time series data represented, or in one embodiment, one or more sets of time series data may be employed in two or more SLAs. As such, the management of time series data may become complex based on the quantity of SLAs and the cross-over of tracking data. Referring to FIG. 5, a dependency graph (500) is provided illustrating the relationship of multiple service level agreements (SLAs) to the metrics being observed. As shown herein, the graph is represented in a hierarchy, with three levels (510), (540), and (560). The first level (510) represents active SLAs, and is shown herein represented by three SLAs, $SLA_1$ (512), $SLA_2$ (514), and $SLA_3$ (516), although this quantity should not be considered limiting. In one embodiment, there may be additional SLAs or fewer SLAs. The second level (540) represents derived metrics, shown herein as (542) and (544). In the example shown herein, there is a relationship between the derived metrics (542) and (544), with derived $metric_b$ (544) computed from derived $metric_a$ (542). In one embodiment, the derived metrics (542) and (544) may not be inter-related, as shown herein. This dependency is for descriptive purposes only and should not be considered a limiting embodiment. The third level (560) represents a current value of observed metrics as read from instrumentation. As shown, the third level (560) is represented by $metric_1$ (570), $metric_2$ (580), and $metric_3$ (590)

One customer of a service provider may have a plurality of SLAs, as shown in this example representation. $SLA_1$ (512) is shown comprised of both a current value of derived $metric_a$ (542) and observed $metric_2$ (580), derived $metric_a$ (542) computed from observed $metric_1$ (570). $SLA_2$ (514) is comprised of the derived $metric_b$ (544), which is computed from both derived $metric_a$ (542) and observed $metric_2$ (580). $SLA_3$ (516) is comprised of both current and computed metrics. More specifically, $SLA_3$ (516) is comprised of the derived $metric_b$ (544) and the observed $metric_3$ (590), with the derived $metric_b$ (544) being computed from the derived $metric_a$ (542) and the observed $metric_2$ (580).

Each observed metric (570), (580), and (590) is shown with respective observations of each metric at various times, as read from instrumentation. For example, and as shown, $metric_1$ (570) is associated with observations including observations (572), (574), (576), and (578). Observation (572) is an observation of $metric_1$ (570) at $time_1$, observation (574) is an observation of $metric_1$ (570) at $time_2$, observation (576) is an observation of $metric_1$ (570) at time n, and observation (578) is an observation of $metric_1$ (570) at time n+m. Similarly, metric (580) is associated with observations (582), (584), (586), and (588), and metric (590) is associated with observations (592), (594), (596), and (598).

In one embodiment, an associated utility of the summation of all the current values of a specific instrumentation being observed is set to the integer one if the observation is current at a required granularity, and is otherwise set to zero. Similarly, in one embodiment, an associated utility of the summation of all the aggregate values of a specific instrumentation being observed is assigned a decay or discount factor.

Figure 6:
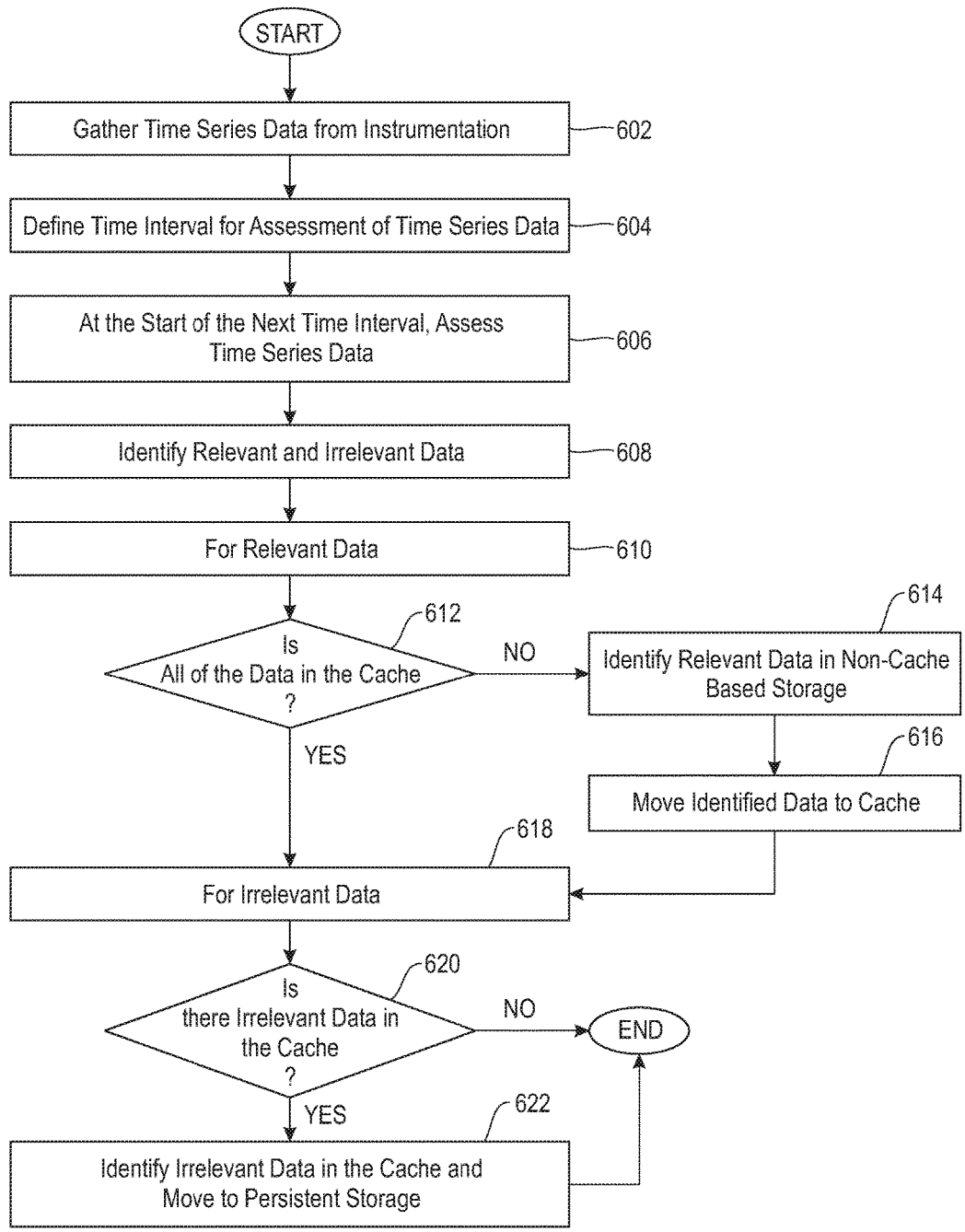
FIG. 6 depicts a flow chart illustrating a process for deterministically managing data.

As described herein, the time series data is retained in data storage, which is organized in a hierarchy. The data may be moved among the tiers of the storage hierarchy, including up-tiering and down-tiering. In one embodiment, current data and associated metric values are retained in storage cache, also referred to herein as a solid state storage device (SSD), and non-current data is retained in persistent storage, such as a magnetic data storage. Data that is employed in any of the current metrics as defined by the retention policy is defined herein as current data, and all other metric data is referred to herein as non-current data. Referring to FIG. 6, a flow chart (600) is provided illustrating a process for deterministically managing data within a hierarchically defined storage system. As shown, daily time series data is gathered from associated instrumentation (602). A time interval for the assessment of the time series data is defined (604). That is, the parameters of data are defined with respect to relevance and the time series being tracked and evaluated. Data may be moved within the storage hierarchy based on the classification of data as relevant or irrelevant, which in one embodiment may be based on time.

At the start of the next time interval, an assessment is made with respect to the time series data (606). More specifically, the assessment identifies data is relevant data and irrelevant data (608), with relevant data being a part of the retention policy, and irrelevant data not being a part of the retention policy. For data defined as relevant (610), it is determined if all of the data is present in the storage cache (612). A negative response to this determination is followed by identifying the relevant data that is present in the non-cache based storage (614), e.g. persistent storage, and moving the identified data to the cache based storage (616). However, either following step (616) or a positive response to the determination at step (612), the evaluation of irrelevant data takes place (618). More specifically, it is determined if there is data present in the cache based storage that is defined as irrelevant with respect to the current retention policy (620). A positive response to this determination is followed by identifying the irrelevant data that is present in the cache based storage and moving the identified data to the non-cache based storage (622), e.g. persistent storage. A negative response to this determination concludes the data identification and movement process with respect to time and the retention policy. Accordingly, data may be moved within the storage hierarchy based on one or both of the passage of time and the retention policy, including any changes made to the retention policy.

In one embodiment, the time series data is managed consecutively. However, in one embodiment, the time series data may be managed non-consecutively. For example, the time series data is shown and described based on a daily instrumentation values that are aggregated into weekly values, and from their into a multi-week running average. Based on the underlying parameter of a weekly value, any seven day period may be removed from the daily time series data. Similarly, in one embodiment, the time series data may be aggregated for a five day running average, in which case data may be upgrade or downgraded in the data storage in increments of five days. Accordingly, data is deterministically managed in the data storage system based on the parameters of the hierarchy and the associated metric retention policy.

Figure 7:
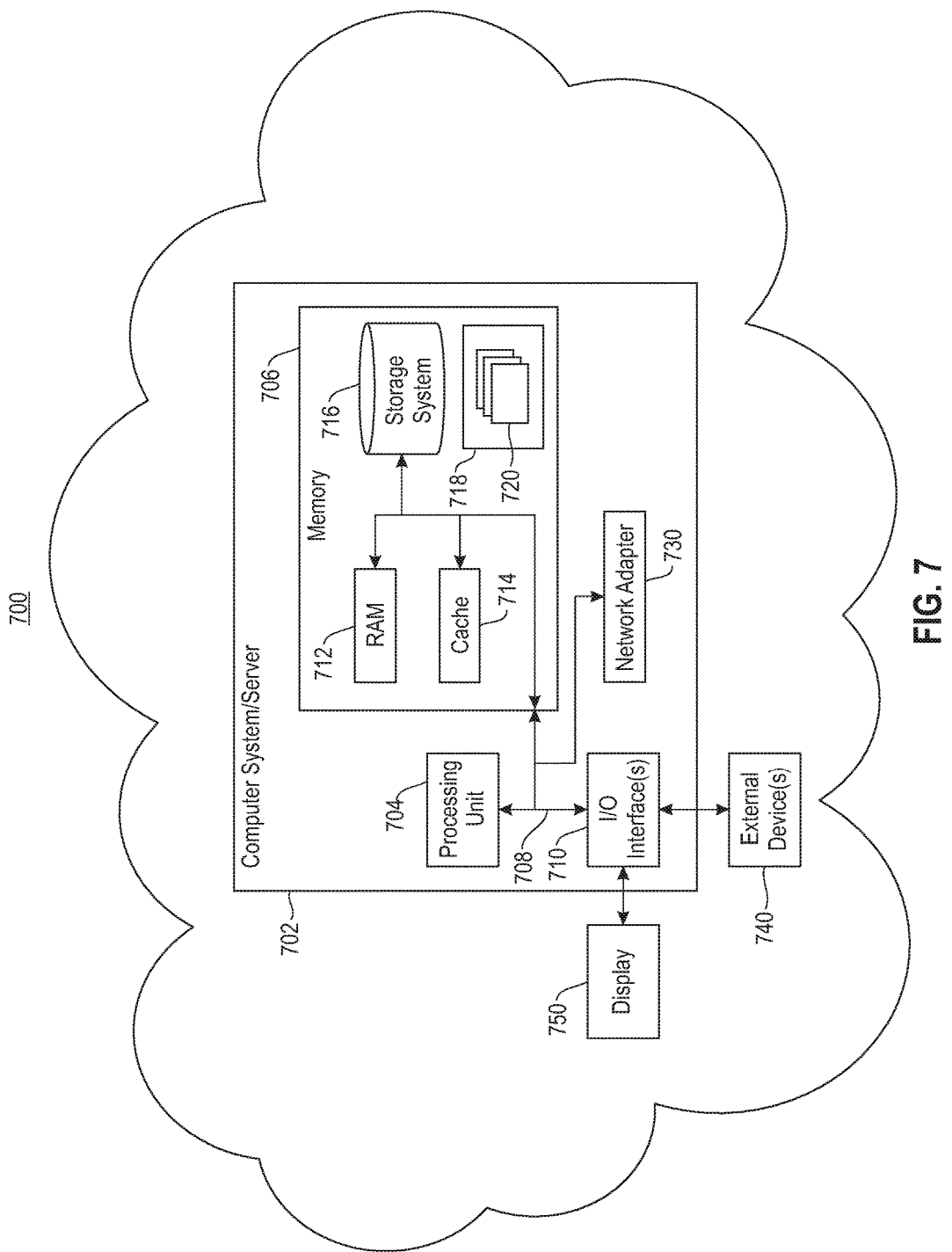
FIG. 7 depicts a block diagram illustrating an example of a computer system/server for software defined monitoring.

The embodiments described above may be implemented in a computer system to handle resource monitoring requests. With reference to FIG. 7, a block diagram (700) is provided illustrating an example of computer system/server (702), hereinafter referred to as a host (702) for software defined monitoring. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and filesystems (e.g., distributed storage environments and distributed cloud computing environments) that include any of the above systems or devices, and the like.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host (702) is shown in the form of a general-purpose computing device. The components of the host (702) may include, but are not limited to, one or more processors or processing units (704), system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by the host (702) and it includes both volatile and non-volatile media, removable and non-removable media.

Memory (706) can include computer system readable media in the form of volatile memory, such as random access memory (RAM) (712) and/or cache memory (716). Host (702) further includes other removable/non-removable, volatile/non-volatile computer system storage media. By way of example only, storage system (716) is shown providing reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces. As will be further depicted and described below, memory (706) may include at least one program product having a set (e.g., at least one) of program modules that are configured to carry out the functions of the embodiments described above with reference to the above Figures.

Program/utility (716), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of management of the embodiments of the time series data and the data storage hierarchy as described herein.

Host (702) may also communicate with one or more external devices (740), such as a keyboard, a pointing device, etc.; a display (750); one or more devices that enable a user to interact with the host (702); and/or any devices (e.g., network card, modem, etc.) that enable the host (702) to communicate with one or more other computing devices. Such communication can occur via Input/Output (I/O) interface(s) (702). Still yet, the host (702) can communicate with one or more networks such as a local area network (LAN), a general wide area network (WAN), and/or a public network (e.g., the Internet) via network adapter (730). As depicted, network adapter (730) communicates with the other components of the host (702) via bus (708).

It should be understood that although not shown, other hardware and/or software components could be used in conjunction with the host (702). Examples, include, but are not limited to: microcode, device drivers, redundant processing units, external disk drive arrays, RAID systems, tape drives, and data archival storage systems, etc.

The host of FIG. 7 may be embodied in a cloud computing architecture as a cloud computing node. For example, in one embodiment, the time series data may be accumulated from different service providers distributed across a plurality of cloud computing resources. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. One or more components of the host may be configured with a communication platform that supports communication with externally available shared resources (e.g. cloud supported products and services), also referred to herein as a cloud model. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
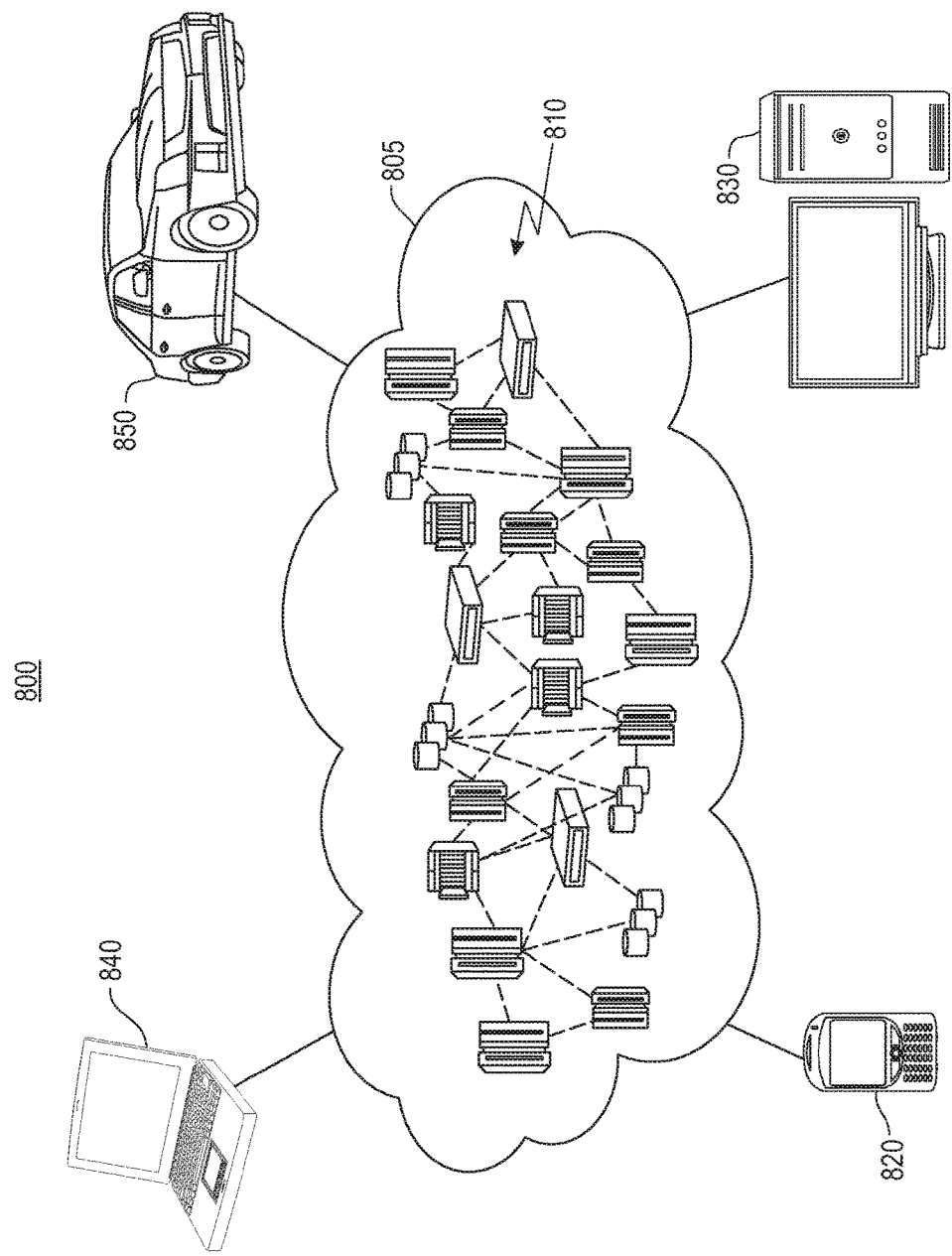
FIG. 8 depicts a block diagram illustrating an exemplary cloud computing environment.

Referring now to FIG. 8, an illustrative cloud computing environment 900) is depicted. As shown, cloud computing environment (800) comprises one or more cloud illustrating computing nodes (810) with which local computing devices used by cloud consumers, such as, for example, personal digital assistant (PDA) or cellular telephone (854A), desktop computer (854B), laptop computer (854C), and/or automobile computer system (854N) may communicate. Nodes (810) may communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A)-(854N) shown in FIG. 8 are intended to be illustrative only and that computing nodes (810) and cloud computing environment (800) can communicate with any type of computerized device over any type of network and/or network addressable connection (e.g., using a web browser).

Figure 9:
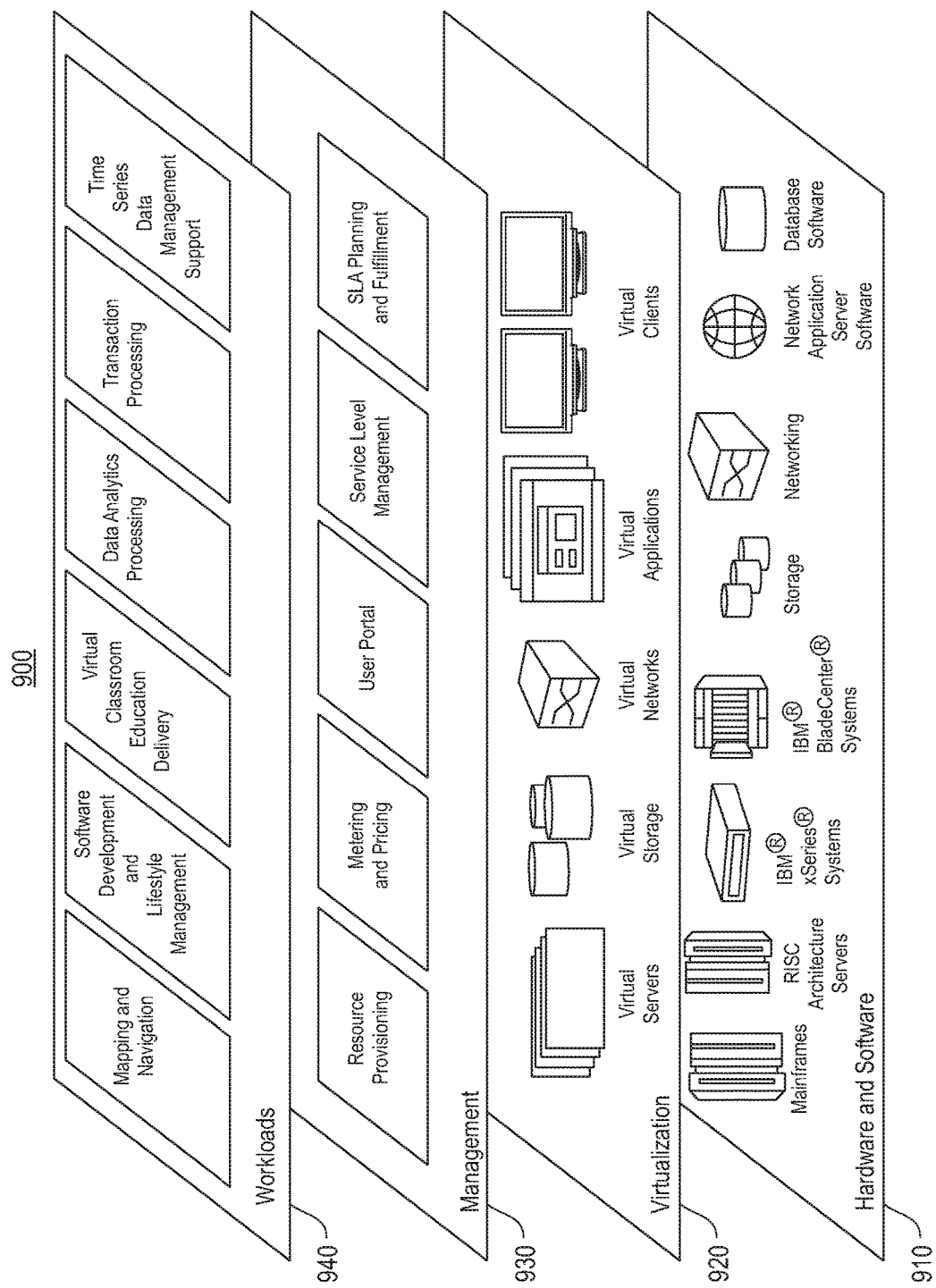
FIG. 9 depicts a diagram illustrating a set of abstraction layers provided by the cloud computing environment of FIG. 8.

Referring now to FIG. 9, a set of functional abstraction layers (900) provided by a cloud computing environment of FIG. 8 is shown. It should be understood in advance that the components, layers, and functions shown in FIG. 9 are intended to be illustrative only and embodiments of the invention are not limited thereto. As depicted, the following layers and corresponding functions are provided:

Hardware and software layer (910) includes hardware and software components. Examples of hardware components include mainframes; RISC (Reduced Instruction Set Computer) architecture based servers; servers; blade servers; storage devices; networks and networking components. In some embodiments, software components include network application server software and database software.

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include: mapping and navigation; software development and lifecycle management; virtual classroom education delivery; data analytics processing; transaction processing; and time series data management support within the cloud computing environment.

The aspects described herein may be embodied in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. The manner in which metric data is gathered and employed directly corresponds to maintenance of SLAs and management of associated service level organizations (SLOs). The hierarchy of the data storage and caching of current data supports efficient reporting and compliance of associated SLAs. Accordingly, the scope of protection of this invention is limited only by the following claims and their equivalents.

We claim:
1. A system comprising:
a processor in communication with memory;
a data storage system in communication with the processor, the data storage system comprising a cache storage location and a persistent storage location; and
one or more tools in communication with the processor, the tools to:
analyze a data retention policy;
identify a relevance of a set of metric data based on the analysis, wherein the set of metric data includes an aggregation of metric observations, the identification of relevance including the one or more tools to identify the metric observations in support of the aggregation as active metric data, wherein the identified relevance is at least partially based on time;
select a storage location in the data storage system for the set of metric data based on the identified relevance; and
retain the set of metric data in the selected storage location, including the one or more tools to retain the active metric data in the cache and inactive metric data in the persistent storage; and
identifying a storage device holding data associated with a change in the data retention policy, and communicating a modified relevance between each storage device associated with the modified retention policy to mitigate a miss in data movement associated with the change in the data retention policy.
2. The system of claim 1, wherein the data storage system is a tiered storage system, wherein the cache storage is associated with a first tier, and wherein the persistent storage is associated with a second tier.

3. The system of claim 1, wherein the metric data comprises time series data as a sequence of numerical data points in successive order, and further comprising the tools to aggregate the metric data on a time period selected from the group consisting of: daily, weekly, monthly, annually, and combinations thereof.

4. The system of claim 1, further comprising the tools to manage storage of the metric data in the storage hierarchy responsive to a status of the data in relation to the retention policy, wherein managing storage of the data comprises the tools to:
identify a status change of data activity in the storage system based on the retention policy;
move relevant data from the cache to the persistent storage in response to an identification of a status change from active to inactive; and
move relevant data from the persistent storage to the cache in response to an identification of a status change from inactive to active.

5. The system of claim 1, further comprising the tools to automate data storage management with respect to data retention policy management, including the tools to:
analyze a metric expression associated with the data retention policy, including the tools to derive a set of input metrics for each metric definition of the data retention policy;
identify a length of an input window for each metric of the derived set;
create a metric dependency graph based on the identified lengths and the derived set; and
modify the data retention policy based on the graph.

6. The system of claim 1, further comprising the tools to:
analyze a second data retention policy;
identify a cross-over of tracking data with each of the data retention policies based on the analysis; and
adjust management and movement of data in the data storage hierarchy based on the cross-over of tracking data.

7. A computer program product comprising a computer-readable storage medium having computer-readable program code embodied therewith, the program code executable by a processor to:
analyze a data retention policy;
identify a relevance of a set of metric data based on the analysis, wherein the set of metric data includes an aggregation of metric observations, the identification of relevance including the program code to identify the metric observations in support of the aggregation as active metric data, wherein the identified relevance is at least partially based on time;
select a storage location in a data storage system for the set of metric data based on the identified relevance, the data storage system comprising a cache storage location and a persistent storage location; and
retain the set of metric data in the selected storage location, including program code to retain the active metric data in the cache and inactive metric data in the persistent storage; and
identifying a storage device holding data associated with a change in the data retention policy, and communicating a modified relevance between each storage device associated with the modified retention policy to mitigate a miss in data movement associated with the change in the data retention policy.

8. The computer program product of claim 7, wherein the data storage system is a tiered storage system, wherein the cache storage is associated with a first tier, and wherein the persistent storage is associated with a second tier.

9. The computer program product of claim 7, wherein the metric data comprises time series data as a sequence of numerical data points in successive order, and further comprising program code to aggregate the metric data on a time period selected from the group consisting of: daily, weekly, monthly, annually, and combinations thereof.

10. The computer program product of claim 7, further comprising program code to manage storage of the metric data in the storage hierarchy responsive to a status of the data in relation to the retention policy.

11. The computer program product of claim 10, further comprising program code to identify a status change of data activity in the storage system based on the retention policy, move relevant data from the cache to the persistent storage in response to an identification of a status change from active to inactive, and move relevant data from the persistent storage to the cache in response to an identification of a status change from inactive to active.

12. The computer program product of claim 7, further comprising program code to automate data storage management with respect data retention policy management, including program code to:
analyze a metric expression associated with the data retention policy, including program code to derive a set of input metrics for each metric definition of the data retention policy;
identify a length of an input window for each metric of the derived set;
create a metric dependency graph based on the identified lengths and the derived set; and
modify the data retention policy based on the graph.

13. The computer program product of claim 7, further comprising program code to:
analyze a second data retention policy;
identify a cross-over of tracking data with each of the data retention policies based on the analysis; and
adjust management and movement of data in the data storage hierarchy based on the cross-over of tracking data.

14. A method comprising:
analyzing a data retention policy;
identifying a relevance of a set of metric data based on the analysis, wherein the set of metric data includes an aggregation of metric observations, the identification of relevance including identifying the metric observations in support of the aggregation as active metric data, wherein the identified relevance is at least partially based on time;
selecting a storage location in a data storage system for the set of metric data based on the identified relevance, the data storage system comprising a cache storage location and a persistent storage location; and
retaining the set of metric data in the selected storage location, including retaining the active metric data in the cache and inactive metric data in the persistent storage; and
identifying a storage device holding data associated with a change in the data retention policy, and communicating a modified relevance between each storage device associated with the modified retention policy to mitigate a miss in data movement associated with the change in the data retention policy.

15. The method of claim 14, wherein the data storage system is a tiered storage system, wherein the cache storage is associated with a first tier, and wherein the persistent storage is associated with a second tier.

16. The method of claim 14, wherein the metric data comprises time series data as a sequence of numerical data points in successive order, and further comprising aggregating the metric data on a time period selected from the group consisting of: daily, weekly, monthly, annually, and combinations thereof.

17. The method of claim 14, further comprising managing storage of the metric data in the storage hierarchy responsive to a status of the data in relation to the retention policy.

18. The method of claim 17, further comprising identifying a status change of data activity in the storage system based on the retention policy, moving relevant data from the cache to the persistent storage in response to identifying a status change from active to inactive, and moving relevant data from the persistent storage to the cache in response to identifying a status change from inactive to active.

19. The method of claim 14, further comprising automating data storage management with respect data retention policy management, including:
analyzing a metric expression associated with the data retention policy, including deriving a set of input metrics for each metric definition of the data retention policy;
identifying a length of an input window for each metric of the derived set;
creating a metric dependency graph based on the identified lengths and the derived set; and
modifying the data retention policy based on the graph.

20. The method of claim 14, further comprising:
analyzing a second data retention policy;
identifying a cross-over of tracking data with each of the data retention policies based on the analysis; and
adjusting management and movement of data in the data storage hierarchy based on the cross-over of tracking data.

* * * * *